(12) United States Patent
Greenwood et al.

(10) Patent No.: US 7,486,228 B2
(45) Date of Patent: Feb. 3, 2009

(54) METHODS AND SYSTEMS FOR PIECEWISE CURVE FITTING OR RADAR ALTIMETER RANGE GATE DATA

(75) Inventors: Michael W. Greenwood, Maple Grove, MN (US); Michael R. Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 358 days.

(21) Appl. No.: 11/366,132

(22) Filed: Mar. 2, 2006

(65) Prior Publication Data

US 2008/0169972 A1 Jul. 17, 2008

(51) Int. Cl.
*G01S 13/08* (2006.01)
(52) U.S. Cl. ............... 342/123; 342/120; 342/94
(58) Field of Classification Search .......... 342/94, 342/120, 123
See application file for complete search history.

(56) References Cited

U.S. PATENT DOCUMENTS

| | | | |
|---|---|---|---|
| 3,544,996 A | 12/1970 | Pile | |
| 5,047,779 A | 9/1991 | Hager | |
| 5,160,933 A * | 11/1992 | Hager | 342/174 |
| 6,249,745 B1 | 6/2001 | Hsu et al. | |

OTHER PUBLICATIONS

Bakshi et al., "Compression of Chemical Process Dta by Functional Approximation and Feature Extraction", 1996, pp. 477-492, vol. 42, No. 2, Publisher: AlChe.

Dunham, "Optimum Uniform Piecewise Linear Approximation of Planar Curves", "IEEE Transactions On Pattern Analysis and Machine Intelligence", 1986, pp. 67-75, vol. 8, No. 1, Publisher: IEEE Computer Society.

Garcia et al., "A Dynamic Approach for Clustering Data", "Signal Processing", 1995, pp. 181-196, vol. 44, No. 2, Publisher: North-Holland Pub. Co.

Goodrich, "Efficient Piecewise-Linear Function Approximation Using the Uniform Metric", "SCG94", 1994, pp. 322-331.

Hoppner, "Handling Feature Ambiguity In Knowledge Discovery From Time Series", "LNCS", 2002, pp. 398-405, No. 2534, Publisher: In Proc. of the 5th Int. Conf. on Information Discovery Science, Published in: Lubeck, Germany.

Hoppner, "Piecewise Linear Function Approximation by Alternating Optimization", 2000, pp. 1751-1757, Publisher: In Proc. of the 8th Int. Conf. on Information Processing and Management of Uncertainty in Knowledge Based Systems (IPMU), Published in: Madrid, Spain.

(Continued)

*Primary Examiner*—Thomas H Tarcza
*Assistant Examiner*—Timothy A Brainard
(74) *Attorney, Agent, or Firm*—Fogg & Powers LLC

(57) ABSTRACT

A method for compensating for range gate slide with respect to received returns within a radar altimeter is described. The method includes adjusting the amount of overlap between a range gate pulse and a radar return signal until an altitude output by the radar altimeter is within a desired tolerance, and incrementally increasing an amount of attenuation within the receiver circuit of the radar altimeter until the radar altimeter breaks track with the radar return signal. the method also includes recording a signal strength and altitude output at each increment of attenuation, determining an altitude error for each altitude output, and fitting the signal strength data against the altitude error using a plurality of variable length line segments.

19 Claims, 4 Drawing Sheets

OTHER PUBLICATIONS

Imai et al., "An Optimal Algorithm for Approximating a Piecewise Linear Function", "Information Processing Society of Japan", 1986, pp. 159-162, vol. 9, No. 3, Publisher: Journal of Information Processing.

Julian et al., "Canonical Piecewise-Linear Proximation of Smooth Functions", "TCS1", 1998, pp. 567-571, vol. 45, No. 5.

Kasco, "Approximation by means of piecewise linear functions", "Results in Mathmatics", 1999, pp. 89-102, vol. 35, Publisher: Basel:Birkhauser.

Keogh et al., "Scaling up Dynamic Time Warping to Massive Datasets", 1999, pp. 1-11, vol. PKDD99, No. 1704, Publisher: Berlin: Springer.

Keogh et al., "An Enhanced Representation of Time Series Which Allows Fast and Accurate Classification, Clustering and Relevance Feedba", 1998, pp. 239-241, vol. KDD98.

Keogh, "A Fast and Robust Method for Pattern Matching in Time Series Databases", 1997, p. 7 pages, Publisher: Proceedings of 9th Int. Conf. on Tools with Al (TAI 97).

Keogh et al., "A Probablistic Approach to Fast Pattern Matching in Time Series Databases", 1997, pp. 20-24, vol. KDD97, Publisher: International Conference on Knowledge Discovery and Data Mining.

Sklansky and Gonzalez, "Fast Polygonial Approximation of Digitized Curves", "Pattern Recognition", Jan. 10, 1980, pp. 327-331, vol. 12, Publisher: Pergamon Press Ltd., Published in: Great Britain.

* cited by examiner

METHODS AND SYSTEMS FOR PIECEWISE CURVE FITTING OR RADAR ALTIMETER RANGE GATE DATA

BACKGROUND OF THE INVENTION

This invention relates generally to processing of radar data, and more specifically, to methods and systems for piecewise curve fitting of radar altimeter range gate data.

The proper navigation of an aircraft in all phases of its flight is based to a large extent upon the ability to determine the terrain and position over which the aircraft is passing. In this regard, instrumentation, such as radar systems, and altimeters in combination with the use of accurate electronic terrain maps, which provide the height of objects on a map, aid in the flight path of the aircraft. Electronic terrain maps are well known and are presently used to assist in the navigation of aircraft.

Pulse radar altimeters demonstrate superior altitude accuracy due to their inherent leading edge return signal tracking capability. The pulse radar altimeter transmits a pulse of radio frequency (RF) energy, and a return echo is received and tracked using a tracking system. The interval of time between signal bursts of a radar system is called the pulse repetition interval (PRI). The frequency of bursts is called the pulse repetition frequency (PRF) and is the reciprocal of PRI.

To scan a particular area with the radar altimeter, range gates are utilized within the radar altimeter to partition the swath created by a Doppler filter within the altimeter. A range gate is typically set in time, the time being the expected time for a transmitted signal to travel to the ground, reflect, and travel back to a receiving antenna. The range gate is set to allow, for example, the main lobe of the reflected return signal to be processed while rejecting harmonics of the return signal and radar returns reflected from objects other than the ground. To scan a certain swath, many radar range gates operate in parallel. With the range to each partitioned area determined, a record is generated representing the contour of the terrain below the flight path. Electronic maps are used with the contour recording to determine the aircraft's position on the electronic map. Such systems are extremely complex with all the components involved as well as the number of multiple range gates that are required to cover a terrain area. As a result, the computations required for such a system are very extensive.

BRIEF SUMMARY OF THE INVENTION

In one aspect, a method for compensating for range gate slide with respect to received returns within a radar altimeter is provided. The method comprises adjusting the amount of overlap between a range gate pulse and a radar return signal until an altitude output by the radar altimeter is within a desired tolerance and incrementally increasing an amount of attenuation within the receiver circuit of the radar altimeter until the radar altimeter breaks track with the radar return signal. The method further comprises recording a signal strength and altitude output at each increment of attenuation, determining an altitude error for each altitude output, and fitting the signal strength data against the altitude error using a plurality of variable length line segments.

In another aspect, a radar altimeter is provided that is configured with a radar range gate. The radar altimeter includes a processor programmed to receive an altitude error and a signal strength associated with the altitude error for a plurality of radar range measurements, fit the signal strength data against the altitude errors using a plurality of variable length line segments, and generate compensation data based on the line segments to correct altitude measurements.

In still another aspect, a method for generating calibration coefficients relating to range gate operation within a radar altimeter is provided. The method includes storing an altitude error and an associated signal strength for a plurality of radar return signals, performing a grid search of the signal strength/altitude error data to generate a list of possible line segment lengths for each of a given number of line segments, and executing a piecewise linear fit for each line segment defined in the list.

DETAILED DESCRIPTION OF THE INVENTION

Figure 1:
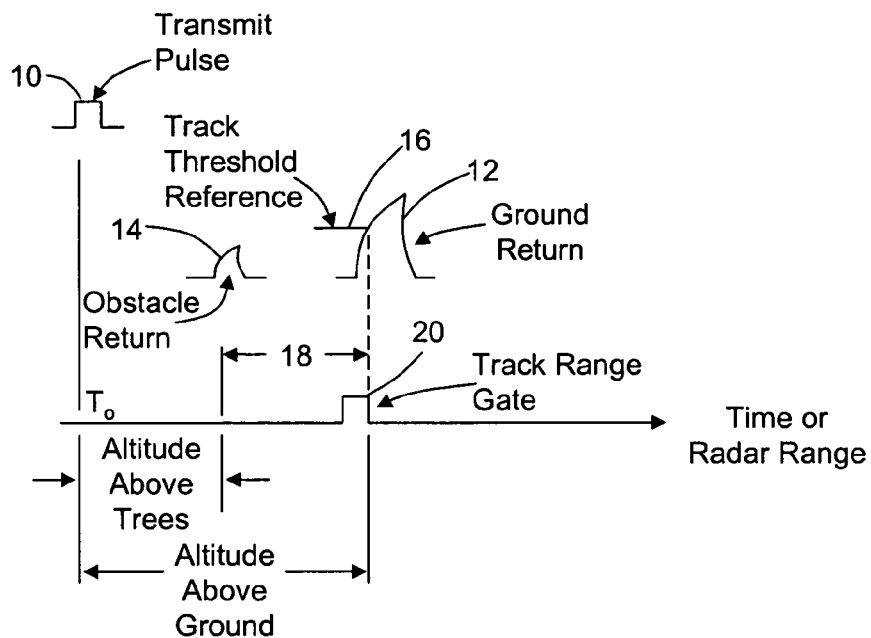
FIG. 1 is a timing diagram illustrating operation of a radar range gate.

In a general altitude range tracking radar, i.e. a radar altimeter, range is measured and indicated by measuring the time for transmitted energy to be reflected from the surface and returned. With reference to FIG. 1, which pertains to the downward-looking system, the radar transmitter repeatedly sends out bursts of electromagnetic energy at a predetermined repetition rate from a relatively wide-beam antenna, as indicated by a transmit pulse 10. Following a time delay which is a function of the aircraft's altitude, a ground return pulse 12 is received by a receiving antenna feeding a receiver. A second return 14 from objects such as treetops may also be applied to the receiver input. If, as an example, the ground reflectivity is considerably greater than that of the treetops, and the aircraft has been flying over ground with no trees, a conventional radar would continue to track the ground as it flies over trees. This is due in part to the automatic transmit power level control maintaining the ground return at a nominal level, thereby reducing the low reflectivity treetop return 14 below the track reference level 16. Moreover, the range between the ground and the treetop return (interval 18) is sufficiently large so that a relatively narrow range gate 20 will never overlap the treetop return 14 while tracking the ground return 12 and, hence, the treetop return will not be reflected as a separate received signal.

Figure 2:
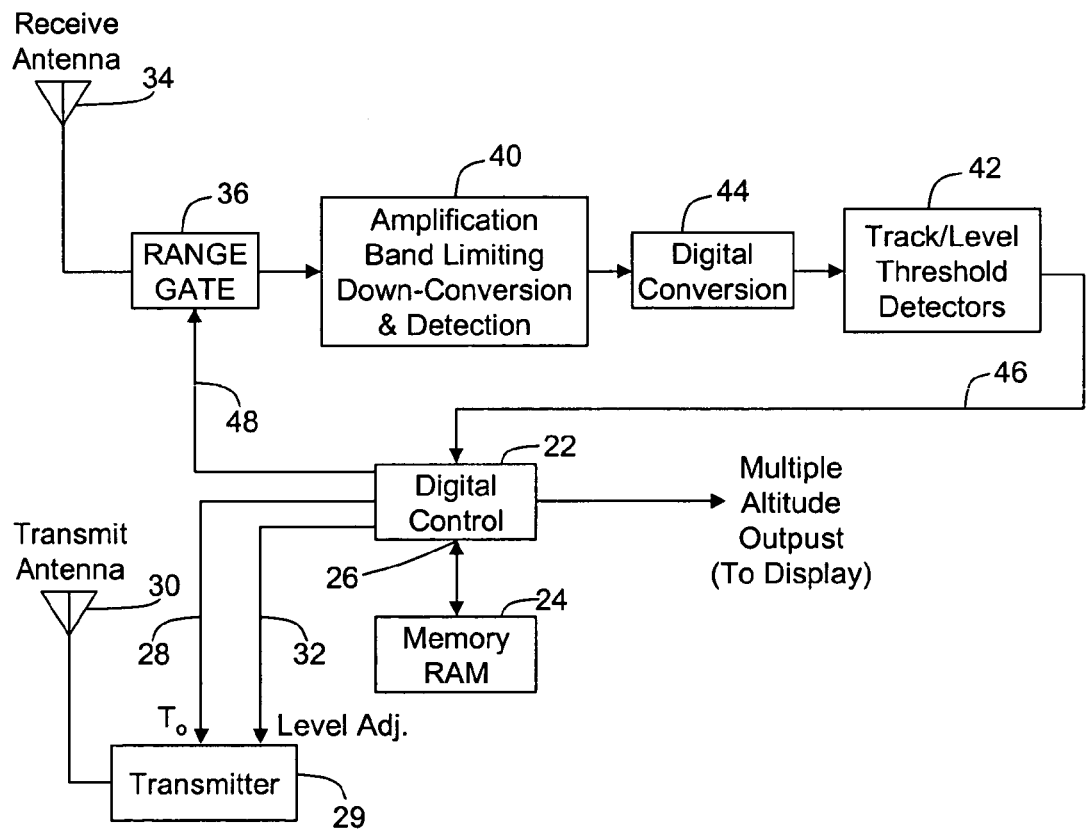
FIG. 2 is a simplified block diagram illustrating signal processing components within a radar altimeter.

FIG. 2 illustrates the components of a radar altimeter designed for multiple target tracking. Overall timing and control of the system is achieved by providing a digital control module 22 having a random access memory 24 coupled to a memory port 26 thereof. Digital controller 22 is coupled to a radar transmitter 27 via line 28 for establishing a time, $T_0$, at which transmit pulses 10 are generated and applied to a transmitting antenna 30. Digital controller 22 also has an output line 32 leading to the transmitter 27 for establishing the amplitude level or power of the transmitted signal. When a second target is being sought on either side of the main return, the automatic transmit power level control is disabled, thereby providing a maximum transmit power so that the return from the lower reflectivity target, e.g., treetops, will cross the level of track reference threshold 16.

After reflecting from the target, return pulse 12 is received by a receiving antenna 34 and is fed through a range gate 36 to a radar altimeter receiver 40. Receiver 40 includes conventional amplification, band-limiting, down-conversion, and peak detection circuitry well known to those skilled in the art. The resulting signal is then fed to an A/D converter 41 whose output, in turn, is applied to a threshold detector circuit 42 and a determination is made whether a target is present by establishing whether return signal 12 exceeds a prescribed threshold. A return meeting the prescribed criteria is then fed via a bus 46 to digital controller 22. An output 48 from digital controller 22 is applied to range gate 36 and is used to align range gate 36 with the leading edge of a return pulse, for example, the leading edge of ground return 12.

The aircraft altitude, then, is directly proportional to the delay interval between the time that transmitter 27 outputs a transmission and the leading edge of range gate pulse 20 (shown in FIG. 1). In various embodiments, range gate 36 is configured to move or slide, in time, a position of range gate pulse 20 as an altitude of the air vehicle in which the radar altimeter varies. More specifically, a position of range gate pulse 20 varies as the time that elapses between transmission of a radar pulse from transmitter 29 and the reception of the leading edge of corresponding ground return signal 12 at range gate 36.

Figure 3:
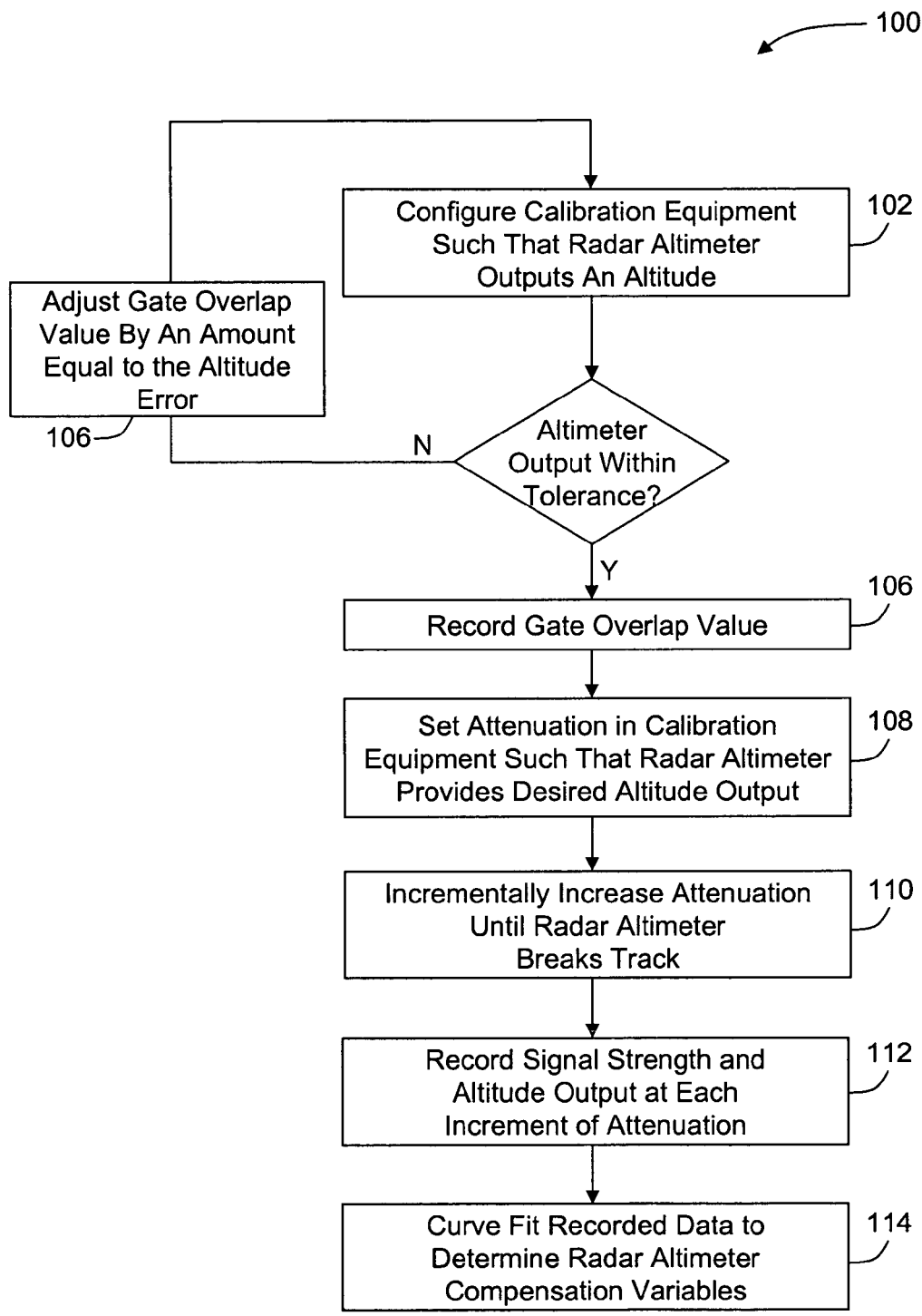
FIG. 3 is a flowchart illustrating a radar altimeter calibration method.

To ensure that range gate 36 processes the leading edge of ground return signal 12 at or near track reference threshold point 16, a curve fitting algorithm is sometimes incorporated within range gate 36. This curve fitting algorithm may also be utilized when calibrating a radar altimeter. FIG. 3 is a flowchart 100 illustrating a calibration method for providing a desired amount of overlap between a range gate pulse and a received return signal, which results in accurate altitude data being provided from digital control 22 (shown in FIG. 2).

Referring to flow chart 100, calibration equipment is configured 102 such that the radar altimeter outputs a first altitude, for example, 0 feet. If the radar altimeter outputs altitude that is within a tolerance, for example ±0.1 foot, a gate overlap value is recorded 104, or stored. Otherwise a gate overlap value is adjusted 106 by an amount equivalent to the altitude error. In a specific embodiment, the gate overlap value varies from about 0.05 to about 0.20. This value represents the percentage of range gate signal overlap on a received radar return signal, where 0.05=5% overlap, and relates to an altitude offset. Increasing the gate overlap value increases the altitude value output by the radar altimeter. Similarly, decreasing the gate overlap value decreases the altitude output. Once the radar altimeter outputs an altitude within the desired tolerance, the gate overlap value is recorded 104.

For calibration of gate slide compensation, attenuation in the calibration equipment is set 108 such that the radar altimeter outputs a desired altitude output. Attenuation is then increased 110, for example in 0.5 dB increments, until the radar altimeter breaks track. At each increment, altitude and signal strength data are recorded 110. The recorded signal strength altitudes are saved 112 to a file for post processing, for example using a piecewise linear curve fit, as described below. The above described gate overlap calibration and gate slide compensation processes may be repeated for several altitudes (e.g., 0 feet, 750 feet, 1500 feet, and 5000 feet) and several temperatures, the resulting data for each altitude and temperature being saved for post processing.

Compensation variables for the radar altimeter are determined during post processing. Specifically, gate slide compensation data is determined, in one embodiment, by curve fitting 114 signal strength against gate slide data, which is determined from altitude outputs, using a continuous piecewise linear algorithm. In an embodiment, the algorithm provides for variable length line segments. In one specific embodiment, and as described herein, the piecewise linear algorithm determines a length for three variable length line segments having the following variables.

x=Signal Strength
y=Altitude error
$M_1$=Slope of Line Segment 1
$M_2$=Slope of Line Segment 2
$B_1$=Y intercept of Line Segment 1
$B_2$=Y intercept of Line Segment 2
$K_1$=X intercept of Line Segment 1
$K_2$=X value for Line Segment 1 intercept with Line Segment 2

In this embodiment, the recorded data is curve fit according to $y_1=M_1x+B_1$ which is the first line segment equation defined from $K_2$ to $K_1$, and $y_2=M_2x+B_2$ which is the second line segment equation defined from 0 to $K_2$, where $$K_1 = \frac{-B_1}{M_1}$$

is the intercept for the first line segment with the x axis and $$K_2 = \frac{B_2 - B_1}{M_1 - M_2}$$

is the intercept of the first line segment with the second line segment.

In a specific embodiment of the algorithm, signal strength is a dimensionless quantity that varies, for example, from zero to seven, where zero is a minimum signal level and seven is a maximum signal level. A signal level of seven indicates that the received signal is being held at a constant level by a power management control unit.

Figure 4:
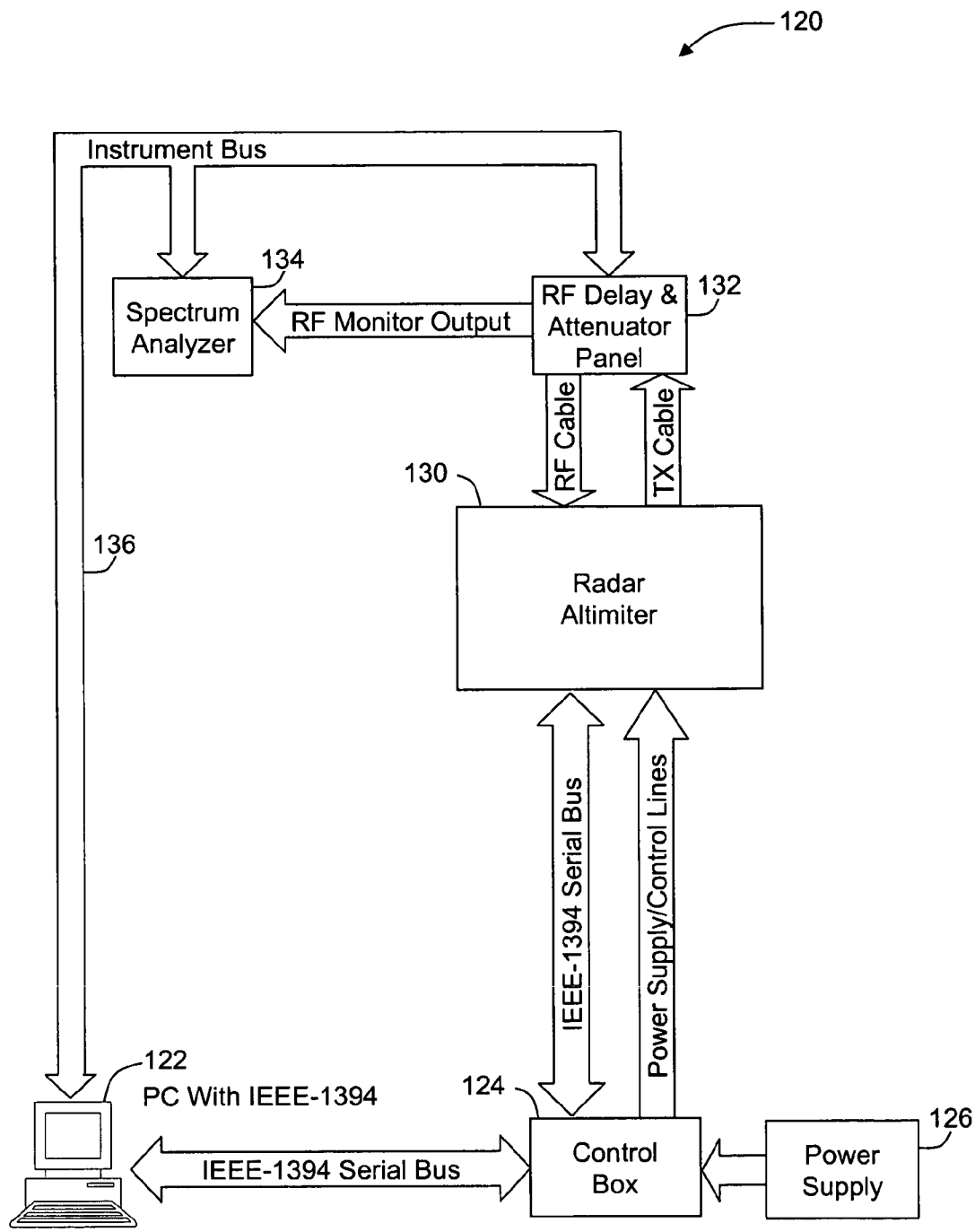
FIG. 4 is a block diagram of a system for calibrating radar altimeters.

FIG. 4 is a block diagram of a radar altimeter calibration system 120 that includes a computer 122 communicatively coupled to a controller 124. A power supply 126 provides power to control box 124. Control box 124 is configured to route power from power supply 126 and communications from computer 122 to a radar altimeter 130 that is under test and being configured with calibration coefficients. A RF delay and attenuator panel 132 is coupled to receive transmissions from radar altimeter 132. RF delay and attenuator panel 132 is also configured to delay and attenuate these received transmissions, which are then returned to the radar altimeter 130 for processing as an altitude measurement. A spectrum analyzer 134 may be utilized to monitor the RF energy received and output from RF delay and attenuator panel 132. An instrument bus 136 originating from computer 122 is utilized to control operation of both RF delay and attenuator panel 132 and spectrum analyzer 134.

Given an RF delay and attenuator panel 132 configuration, the signal to be received by radar altimeter 130 is held at a constant level by controlling the output power from the transmitter 29 of the radar altimeter 130 by power management control circuitry within the digital control 22. The power management control within the digital control 22 operates using a dimensionless parameter that varies, for example, from zero to 4096 (e.g., 12 bits). Zero represents maximum transmitted output power and 4096 represents minimum transmitted output power.

Once the transmitted output power reaches its maximum value and the transmission losses increase the signal received by radar altimeter 130 from RF delay and attenuator panel 132 will also decrease. This loss of signal level causes a gate slide error within radar altimeter 130 which is embodied as an altitude error output by radar altimeter 130. In one embodiment, gate slide and gate slide error are measured in feet.

Figure 5:
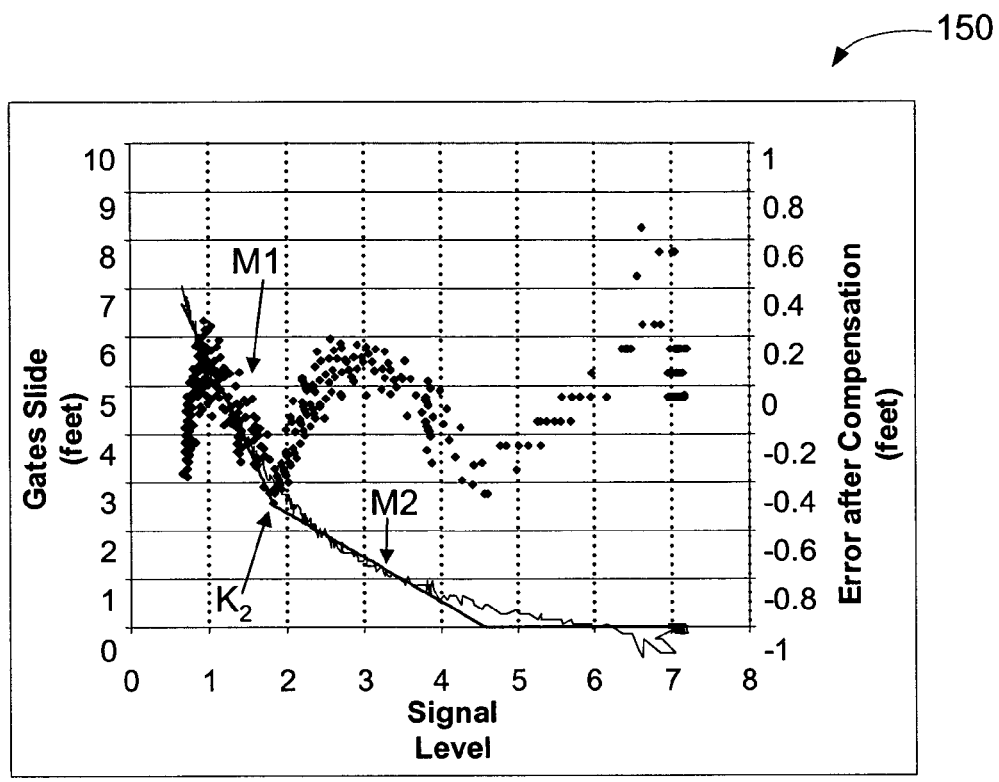
FIG. 5 is a graph of radar range gate slide against signal strength, illustrating variable length piecewise linear approximation.
Figure 6:
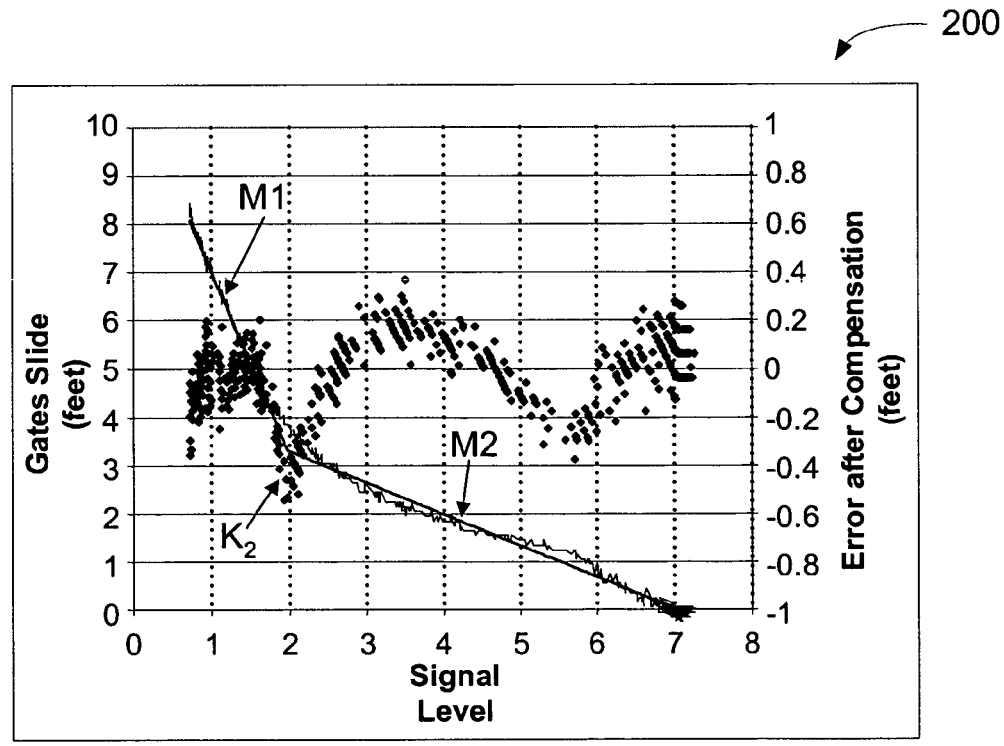
FIG. 6 is a graph of radar range gate slide against signal strength, illustrating a second variable length piecewise linear approximation.

To compensate for gate slide error the gate slide value is measured relative to signal level within radar altimeter 130 which allows it to generate a compensation curve to correct for the altitude error. As illustrated in FIG. 5, which is a graph 150 of gate slide versus signal strength, and FIG. 6, which is a second graph 200 of gate slide versus signal strength, the data has the characteristic shape of an exponential response, with increasing error (and gate slide) as signal strength decreases. Graph 150 and graph 200 illustrate variable lengths for the line segments. In a specific embodiment that is illustrated by graphs 150 and 200, the operational program that is run within radar altimeter 130 utilizes a three segment piecewise linear correction algorithm, although any number of segments may be utilized. The operational program includes code that automatically generates three line segment coefficients, in a specific embodiment, in the form of y=mx+b.

In this embodiment, the code is configured to output six variables that define the three line segments; $a_2$, $a_3$, $b_2$, $b_3$, slope__1 and slope__2. The relationship between these variables and the curve fit coefficients used by the calibration file, in one embodiment and as described above, is as follows:

$M_1$=slope2

$M_2$=slope1

$K_1$=$a_3$ $K_2$=$a_2$ $B_1$=$a_3$*slope2*(−1)

$B_2$=[$a_2$*slope1*(−1)]+$b_2$ $B_3$=y offset of the third line segment which has a slope of zero, which is assumed to be zero.

As can be appreciated by those skilled in the art, the equations provide three line segments that are variable in length. Radar altimeter 130 is programmed, in an embodiment, to vary the lengths of the line segments which also allows radar altimeter 130 to make the best fit of the given signal strength/altitude error data to the line segments. To fit the data to the segments, an algorithm within the radar altimeter 130 first executes a grid search to generate a list of possible variable lengths for a given number of line segments (the example used herein is three line segments). Once the list of possible line segments lengths has been generated, the algorithm executes a standard piecewise linear fit for each line segment length in the list, and stores the three line segment lengths from the list of possible segments lengths that resulted in the smallest errors when performing the piecewise linear fitting of the data.

The above described methods and systems provide the capability to curve fit radar range gate slide data to provide altitude accuracy when received signals levels are below automatic gain control signal levels. This capability enhances the operation usable sensitivity range of a radar altimeter as the above described calibration algorithm is configured to select the best length for each line segment used in the piecewise linear curve fit. With this capability of variable line segment length, the data can be better fit to the generated line segments. Previous algorithms required that all line segments be of the same length, which resulted in a less accurate curve fitting of the generated data.

While the invention has been described in terms of various specific embodiments, those skilled in the art will recognize that the invention can be practiced with modification within the spirit and scope of the claims.

What is claimed is:

1. A method for compensating for range gate slide with respect to received returns within a radar altimeter, said method comprising:
   adjusting the amount of overlap between a range gate pulse and a radar return signal until an altitude output by the radar altimeter is within a desired tolerance;
   incrementally increasing an amount of attenuation within the receiver circuit of the radar altimeter until the radar altimeter breaks track with the radar return signal;
   recording a signal strength and altitude output at each increment of attenuation;
   determining an altitude error for each altitude output; and
   fitting the signal strength data against the altitude error using a plurality of variable length line segments.

2. A method according to claim 1 wherein each of the plurality of line segments is independently variable in length.

3. A method according to claim 1 wherein fitting the signal strength data against the altitude error using a plurality of variable length line segments comprises:
   performing a grid search of the signal strength/altitude error data to generate a list of possible lengths for each of a given number of line segments;
   executing a piecewise linear fit for each line segment length in the list; and
   storing the line segment lengths from the list of possible segments lengths that resulted in the smallest errors when performing the piecewise linear fitting of the signal strength/altitude error data.

4. A method according to claim 3 wherein executing a piecewise linear fit for each line segment length in the list comprises generating the plurality of line segment coefficients according to y=mx+b, where m is a slope of the line segment, x is the signal strength data, b is a y-intercept of the line segment, and y is the altitude error data.

5. A method according to claim 1 wherein incrementally increasing an amount of attenuation comprises increasing the attenuation in 0.5 dB increments.

6. A method according to claim 1 wherein fitting the signal strength data against the altitude error using a plurality of variable length line segments comprises generating a compensation curve to correct altitude errors.

7. A method according to claim 1 wherein signal strength is a dimensionless quantity that varies from being equal to or greater than a minimum value and equal to or less than a maximum value.

8. A method according to claim 1 wherein fitting the signal strength data against the altitude error using a plurality of variable length line segments comprises:
   determining a length for each of three line segments where, x=Signal Strength, y is the altitude error, $M_1$=slope of line segment 1, $M_2$=slope of line segment 2, $B_1$=Y intercept of line segment 1, $B_2$=Y intercept of line segment 2, $K_1$=x intercept of line segment 1, and $K_2$=x value for line segment 1 intercept with line segment 2; and curve fitting the data according to $y_1 = M_1 x + B_1$ which is the first line segment equation defined from $K_2$ to $K_1$, $y_2 = M_2 x + B_2$ which is the second line segment equation defined from 0 to $K_2$, where $$K_1 = \frac{-B_1}{M_1}$$

is the intercept for the first line segment with the x axis, $$K_2 = \frac{B_2 - B_1}{M_1 - M_2}$$

is the intercept of the first line segment with the second line segment, and the third line segment has a slope and a y offset both equal to zero.

9. A method according to claim 8 further comprising outputting six variables, $a_2$, $a_3$, $b_2$, $b_3$, slope_1 and slope_2, that define the three line segments according to $M_1$=slope_1, $M_2$=slope_2, $M_3$=0, $K_1$=$a_3$, $K_2$=$a_2$, $B_1$=$a_3$*slope_2*(−1), $B_2$=[$a_2$*slope_1*(−1)]+$b_2$, and $B_3$=0.

10. A method according to claim 1 further comprising repeating the adjusting, incrementally increasing, recording, and determining steps for a plurality of altitudes and temperatures.

11. A radar altimeter configured with a radar range gate, said radar altimeter comprising a processor programmed to:
receive an altitude error and a signal strength associated with the altitude error for a plurality of radar range measurements;
fit the signal strength data against the altitude errors using a plurality of variable length line segments; and
generate compensation data based on the line segments to correct altitude measurements.

12. A radar altimeter according to claim 11 where to fit the signal strength data against the altitude errors using a plurality of variable length line segments, said processor is programmed to:
perform a grid search of the signal strength/altitude error data to generate a list of possible lengths for each of a given number of line segments;
execute a piecewise linear fit for each line segment length in the list; and
store the line segment lengths from the list of possible segments lengths that resulted in the smallest errors when performing the piecewise linear fitting of the signal strength/altitude error data.

13. A radar altimeter according to claim 12 where to execute a piecewise linear fit for each line segment length in the list, said processor is programmed to generate the plurality of line segment coefficients according to y=mx+b, where m is a slope of the line segment, x is the signal strength data, b is a y-intercept of the line segment, and y is the altitude error data.

14. A radar altimeter according to claim 11 where to fit the signal strength data against the altitude errors using a plurality of variable length line segments, said processor is programmed to:
determine a length for each of three line segments where, x=Signal Strength, y is the altitude error, $M_1$=slope of line segment 1, $M_2$=slope of line segment 2, $B_1$=Y intercept of line segment 1, $B_2$=Y intercept of line segment 2, $K_1$=x intercept of line segment 1, and $K_2$=x value for line segment 1 intercept with line segment 2; and curve fit the data according to $y_1 = M_1 x + B_1$ which is the first line segment equation defined from $K_2$ to $K_1$, $y_2 = M_2 x + B_2$ which is the second line segment equation defined from 0 to $K_2$, where $$K_1 = \frac{-B_1}{M_1}$$

is the intercept for the first line segment with the x axis, $$K_2 = \frac{B_2 - B_1}{M_1 - M_2}$$

is the intercept of the first line segment with the second line segment, and the third line segment has a slope and a y offset both equal to zero.

15. A method for generating calibration coefficients relating to range gate operation within a radar altimeter, said method comprising:
storing an altitude error and an associated signal strength for a plurality of radar return signals;
performing a grid search of the signal strength/altitude error data to generate a list of possible line segment lengths for each of a given number of line segments; and
executing a piecewise linear fit for each line segment defined in the list.

16. A method according to claim 15 further comprising:
storing line segment coefficients from the list of possible line segment lengths that resulted in the smallest errors when performing the piecewise linear fitting of the signal strength/altitude error data; and
configuring the radar altimeter to correct altitude errors based on the stored line segment coefficients.

17. A method according to claim 16 wherein configuring the radar altimeter to correct altitude errors based on the stored line segment coefficients comprises programming the radar altimeter to utilize the stored line segment coefficients when processing subsequent radar return data.

18. A method according to claim 15 wherein executing a piecewise linear fit for each line segment length in the list comprises generating line segment coefficients according to y=mx+b, where m is a slope of the line segment, x is the signal strength data, b is a y-intercept of the line segment, and y is the altitude error data.

19. A method according to claim 18 wherein executing a piecewise linear fit for each line segment length in the list comprises:
determining a length for each of three line segments where, x=Signal Strength, y is the altitude error, $M_1$=slope of line segment 1, $M_2$=slope of line segment 2, $B_1$=Y intercept of line segment 1, $B_2$=Y intercept of line segment 2, $K_1$=x intercept of line segment 1, and $K_2$=x value for line segment 1 intercept with line segment 2; and
curve fitting the data according to $y_1 = M_1 x + B_1$ which is the first line segment equation defined from $K_2$ to $K_1$, $y_2 = M_2 x + B_2$ which is the second line segment equation defined from 0 to $K_2$, where $$K_1 = \frac{-B_1}{M_1}$$

is the intercept for the first line segment with the x axis, $$K_2 = \frac{B_2 - B_1}{M_1 - M_2}$$

is the intercept of the first line segment with the second line segment, and the third line segment has a slope and a y offset both equal to zero.

\* \* \* \* \*